United States Patent [19]

Forster et al.

[11] Patent Number: 4,640,841

[45] Date of Patent: Feb. 3, 1987

[54] PROCESS FOR THE EXTRACTION OF HOP SUBSTANCES

[75] Inventors: Adrian Forster; Manfred Gehrig, both of Wolnzach, Fed. Rep. of Germany

[73] Assignee: Hopfenextraktion HVG Barth, Raiser & Co., Wolnzach, Fed. Rep. of Germany

[21] Appl. No.: 683,436

[22] Filed: Dec. 18, 1984

[30] Foreign Application Priority Data

Dec. 23, 1983 [DE] Fed. Rep. of Germany ....... 3346776

[51] Int. Cl.$^4$ ............................................ A23L 1/211
[52] U.S. Cl. .................................. 426/425; 426/489; 426/655; 426/600
[58] Field of Search ............... 426/425, 429, 430, 481, 426/489, 482, 618, 655, 600

[56] References Cited

U.S. PATENT DOCUMENTS

| 4,104,409 | 8/1978 | Vitzthum et al. | 426/600 |
| 4,282,259 | 8/1981 | Wheldon et al. | 426/425 |
| 4,507,329 | 3/1985 | Grant | 426/600 |
| 4,511,508 | 4/1985 | Vollbrecht et al. | 426/600 |

FOREIGN PATENT DOCUMENTS

| 1130988 | 9/1982 | Canada | 426/429 |
| 489719 | 1/1930 | Fed. Rep. of Germany . | |
| 2127618 | 6/1973 | Fed. Rep. of Germany . | |
| 2801843 | 7/1978 | Fed. Rep. of Germany . | |
| 2827002 | 9/1980 | Fed. Rep. of Germany . | |
| 1388581 | 3/1975 | United Kingdom . | |

OTHER PUBLICATIONS

Harold and Clark, The Brewers Digest, Sep. 1979, pp. 45-50 and 68.
Vollbrecht, Chemistry and Industry, Jun. 19, 1982, pp. 397-399.
"The Use of $CO_2$ in the Manufacture of Hop Products'-'—Monatsschrift fur Brauerei, 33, No. 3 (1980)—E. Kruger.

*Primary Examiner*—Raymond N. Jones
*Assistant Examiner*—Carolyn Paden
*Attorney, Agent, or Firm*—Omri M. Behr

[57] ABSTRACT

There is provided a novel procedure for the extraction of a high proportion of the potential bitterness resins from hops by extracting the hops with super critical carbon dioxide at pressures of about 100 to 300 bar temperatures above 100° C.

6 Claims, 1 Drawing Figure

PROCESS FOR THE EXTRACTION OF HOP SUBSTANCES

BACKGROUND OF THE INVENTION

Hop material is added to beer during the brewing process in the form of whole hops, (enriched) hop powder, pellets or as an extract, giving the beer the typical hop bitterness.

Because of the considerable reduction in volume an extract can be more easily transported, more cheaply stored and, because of its good keeping quality, can economically compensate for harvest fluctuations. Moreover, an extract can be readily dosed.

By reason of these advantages hop extracts are now well known in the art. Today, primarily hydrocarbons, chlorinated hydrocarbons and alcohols, e.g. hexane, methylene chloride and ethanol are used as solvents. Nonpolar solvents mainly provide the resin components. Therefore, an aqueous extraction has to follow in order to extract the tannins. With polar solvents, e.g. ethanol, the extract contains already parts of the tannins.

The solvents must, as far as possible, be removed from the pasty extracts. Though the residual solvent content is very low (e.g. with methylene chloride below 0.1%), one must remember that the suspicion that methylene chloride is toxic or cancerogenic, respectively, has not yet been completely invalidated. Thus, tests have recently been made to extract hops with a physiologically harmless solvent, namely with compressed liquid carbon dioxide.

Under ambient conditions gases do not have solvent properties. However, under increased pressure, i.e. in liquified or compressed conditions, respectively, gases may be used as solvents. Below the critical temperature (31° C.) gaseous carbon dioxide can be compressed by increasing pressure and liquified.

By a further increase of pressure the liquid may (to a minor extent) be further compressed. Above the critical temperature the transition from the gaseous into the compressed condition is continuous when pressure is increased, i.e. without discontinuous increase of density as is the case with the compression below the critical temperatue.

DE-OS No. 28 01 843 discloses an extraction process for hop substances with liquid carbon dioxide, where liquid carbon dioxide is passed through a column of hop material at −5° to +15° C. whereby at least part of the alpha acids contained in the hops is extracted into the liquid carbon dioxide and a hop extract of high purity is then obtained from the liquid carbon dioxide.

Using compressed liquified carbonic acid (i.e. the carbonic acid is subcritical with respect to temperature and supercritical with respect to pressure) the hop substances may be treated in accordance with DE-AS No. 28 27 002.

Finally, from DE-PS No. 21 27 618, it is known to extract hops with $CO_2$ which is supercritical with respect to pressure and temperature. Extraction pressures between 100 and 400 bar and extraction temperatures of up to 100° C. are mentioned. On the other hand, (column 4, line 54, et seq.) it is also stated that the thermic sensitivity of the material has to be taken into account and therefore the extraction is preferably carried out between 40° and 50° C.

There is, in fact, a prejudice against submitting natural substances, such as hops, to high temperatures because of chemical reactions which could cause damage.

In several works concerned with changes in substances by reason of the increase of temperature on drying, storing and pelletizing, it has been shown that increased temperatures do indeed cause a degradation of important substances.

In fact, however, the initial extraction with organic solvents is normally followed by an aqueous extraction of the water-soluble substances at temperatures near the boiling temperature of water. However, this additional extraction does not disprove the above described prejudice against high temperatures, because the sensitive substances have already been removed.

Neither is this prejudice disproved by an extraction method described in DE-PS No. 4 89 719. In this extraction the steam-distillable substances are distilled off at 120°–130° C., then the residue product is boiled out in a sugar solution. The thus obtained product is more an aqueous extract and differs in its composition from the resin extract which was obtained with organic solvents or $CO_2$, respectively.

Finally, according to a publication by E. Kruger ("The use of $CO_2$ in the manufacture of hop products") in "Monatsschrift fur Brauerei" 33, No. 3 (1980), which describes the optimal parameters for the hop extraction at temperatures between 21° and 80° C., the yeild of alpha acids does not rise continuously with raising temperature, but on the contrary, from a certain temperature level upward it suddenly decreases.

SUMMARY OF THE INVENTION

It is the surprising finding of this invention that extraction with supercritical carbon dioxide at pressures of about 100 to about 300 bar and temperatures above 100° C., in particular at 110° to 150° C., yields a resin extract of first grade quality. Without having the disadvantages of a solvent residue, this extract is similar in its composition to an extract obtained with methylene chloride. Moreover, the total yields obtained with methylene chloride and with the present process are similar. Utilizing the usual analysis method (Mebak), the present process provides additional hop substances at higher total yield which increase the potential bitterness of the beer. As compared with an extract according to DE-PS No. 21 27 618, this invalidates the reproach of a lack of palatabillity as compared with the beers brewed with conventional $CO_2$ extract.

Moreover, in comparison with the process according to DE-PS No. 21 27 618, the treatment time is reduced despite the lower density of the carbon dioxide at high temperatures.

DESCRIPTION OF THE PREFERRED EMBODIMENTS

Figure 1:
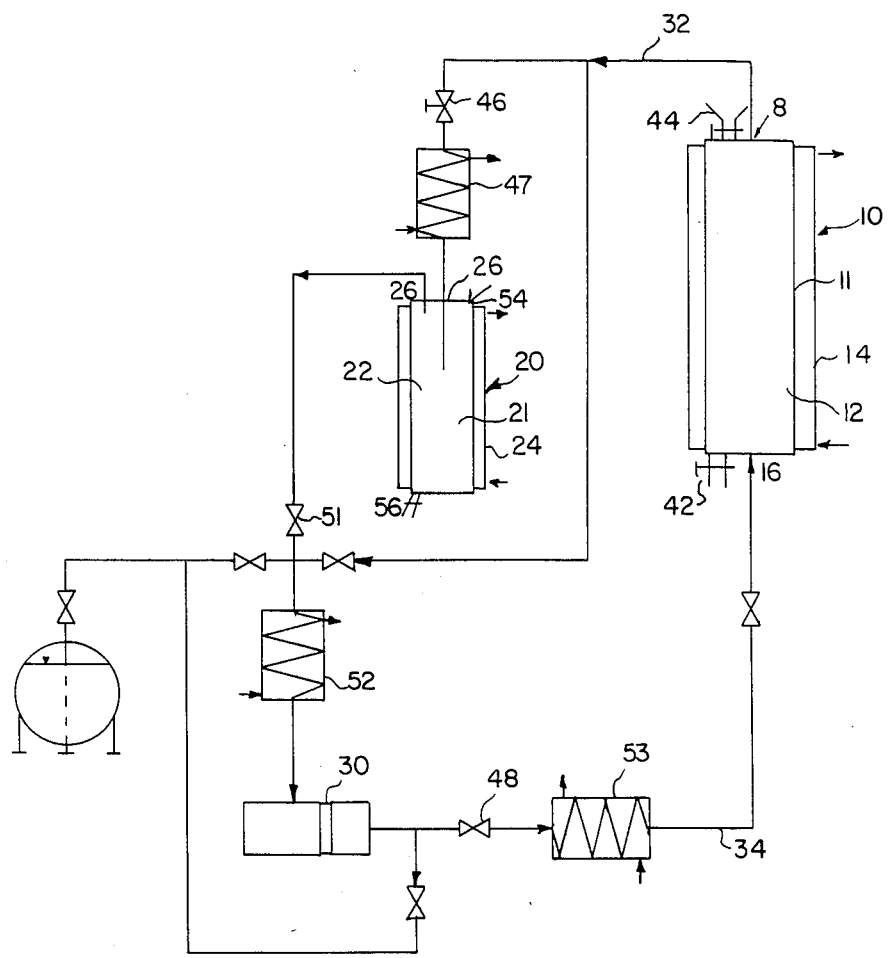
FIG. 1 is a flow diagram of the continuous flow embodiment of the present invention.

In the first step of the invention, compressed supercritical carbon dioxide at above 100° C., suitably 110°–150° C. at about 100–300 bar pressure is mixed with starting material (e.g. whole hops, hop powder, enriched pellets) in a pressure vessel and takes up the extractable substances. In a second step of procedure the mixture of solvent and solvate is separated. To this purpose the solvating power of the solvent has to be drastically reduced, e.g. by reducing its density thru reduction at applied pressure to, say 40–80 bar, suitably to about 60–80 bar or by adsorption (on e.g. bentonite). The solvent is then withdrawn reliquified and fed back into the circuit. The extract may be removed from the separator through a valve.

With respect to the solvent, the process is continuous and with respect to the starting material it is batch wise. Preferably, a fully continuous extraction is aimed at, e.g. by using several extraction vessels or by introducing the starting material into the high pressure vessel through a lock.

The amount of the carbon dioxide solvent required for circulation under the process conditions of the present invention is of the order of 10 to 20 kilograms of solvent per kilogram of hop containing material per contact hour.

The preferred embodiment of the invention is illustrated by the schematic flow diagram of FIG. 1. The principal portions of the apparatus comprise a solvation area 10, a separation area 20 and intermediate pressure raising and lowering means More specifically, there is provided at least one extraction tank 11 containing solid materials 12 having a solvent inflow means 16 and a solvent outflow means 18 and a temperature maintenance means 14. There is also provided a valve controlled inlet means 44 and a valve controlled outlet means 42 for the charging of fresh hop containing materials and the discharge of the extracted materials respectively.

The separation area comprises a separation tank which can exist in two modifications. Where the solvate is to be adsorbed on an absorbant, suitably bentonite, the structure of this area is substantially similar to that of the extracting area. Thus, there is provided a tank 21 for the adsorbant, surrounded by a temperature control jacket 24, an inflow means 26 for solvent and an outflow means 28 for the solvent, an input port 54 for charging fresh adsorbant and an outflow port 56 for the removal of saturated absorbant. The outflow port 18 of extractor unit 10 is connected to inflow port 26 of adsorbing unit 20 by pipeline 32, having placed therein a valve means 46 and heat exchanger 47. Similarly, outflow port 28 of adsorber 20 is connected to inflow port 16 of extractor 10 by means of pipe 34. There is provided in pipe 34, valve means 51, a heat exchanger 52, a pressure raising means 30 suitably in the form of a pump, preferably a rotary pump. A further valve means 48 and a heat exchanger 53 are provided in pipe 34.

In operation of the extraction tank 11 is charged with the hop containing materials 12 thru port 44. Liquid carbon dioxide is then pumped thru entry port 16 and exits thru port 18, flows along pipe 32 into tank 21 containing absorbant 22 thru port 26. The adsorbant then takes up the solvate from the solvent and the thus "purified" solvent exists from tank 21 thru port 28 and is moved by pump means 30 back into tank 10. Upon exhaustion of the hop containing materials these may be removed from port 42 and fresh material charged thru port 44. Similarly upon saturation of the adsorbant materials, they are removed from tank 20 thru port 56 and fresh materials charged charged thru port 54.

Where no absorbing materials are utilized, tank 21 contains no adsorbant. In the operation of the process the extraction step is carried out as before. However, by passing thru valve 46 which is designed as a pressure control valve, and through heat exchange 47 pressure and temperature in tank 21 are reduced with respect to those prevailing in tank 11. This pressure differential reduces the solvating power of the solvent, whereby the extract precipitates out and settles to the bottom of tank 21 from which it may be withdrawn thru port 56. The surplus $CO_2$ is withdrawn from port 28, heated to above critical temperature in exchanger 52. In this modification pump 30 acts as a compressor and passes the compressed $CO_2$ thru valve 48, thru exchanger 53 and an additional valve whereby the solvent is raised to the pressure and temperature conditions necessary for extraction in tank 10.

In a variation of the process of the present invention, adsorbant may be utilized in a tank 21 and predetermined amount of pressure reduction, nevertheless permitted to occur at valve 46 with of course in the corresponding pressure raising at valve 48.

It will be understood by those skilled in the art that the foregoing description is merely schematic and does not cover or describe the various valving means, power sources, seals and the like which would be required in operative equipment but which, nevertheless, would be well understood to be necessary by one skilled in the art.

EXAMPLES

The Examples which follow illustrate the method of the invention as well as its advantages in comparison with the state of the art. Percentages refer to the weight.

The hop variety Hallertauer Nordbrauer, 1981, was used for the tests. In each case, 80 kg of the enriched pellets (type 45) were milled and charged into the extraction vessel. The results represent the mean of at least two tests and were obtained by exhaustive extraction.

Table 1 at the end of the specification shows in addition to extraction pressure and temperature, the yield of extract (A (%)=100 x extract quantity/hop quantity) and the relative yield of the major substances.

The analyzed substances were the total resins (TR), the soft resins (SR), and hard resins (HR=TR−SR) and the components ascertainable by the conductometer value (CV), all measured according to Wollmer or Mebak, respectively. The contents of specific alpha and beta acids were obtained by high pressure liquid chromatography. The figures show which portion of the examined material compared to the starting hop (=100%) was recovered in the extract.

EXAMPLE 1

In a modification of the procedures of DE-OS No. 28 01 843 the hops are exhaustively extracted at 8° C. and 65 bar for 6 hours. The separation was effected by evaporation of the liquid $CO_2$, in a heat exchanger, whereupon the dissolved substance precipitated.

20.9% of the weight of the charged hops was found in the extract. Of the total resin, hard resin, soft resin and the alpha acids of the srarting hop ascertained by the conductometer value 68, 2, 79, and 79% rspectively were found in the extract.

EXAMPLE 2

1 Kg. of air dried hops were extracted at 300 bar and 50° C. for 5 hours with 50 Kg. of liquid $CO_2$ in a continuous flow system as illustrated herein. The separation of the dissolved substances were effected by expanding the solvent down to 60 bar and cooling to 25° C. 26.5% of the weight of the charged hops were obtained in the extract. Of the total resin, hard resin, soft resin and the ingredients of the pellets ascertainable by the conductometer value 83, 14, 95, and 92% respectively, were found in the extract. Specific alpha and beta acids were found at 98 and 97%, respectively, in the extract.

EXAMPLE 3

By extraction of air dried hops with methylene chloride in a laboratory Soxhlet extractor a yield of 31.1% by weight of extract was obtained. Of the total resins, hard and soft resins, the portions ascertained by the conductometer value and the specific alpha and beta acids 96, 88, 97, 100, 99, and 97%, respectively, had come into the extract.

Working Example

In accordance with the present invention, the hops were exhaustively extracted at a pressure of 300 bar and at a temperature of 120° C. for 3 hours. The extract separation was again effected by expanding the solvent down to 60 bar at 40° C. There were utilized between 10–20 Kg. per hour of solvent per Kg. of air dried hops.

This time, 30.4% of the starting hops were found in the extract. As compared to the extraction at 300 bar and 50° C. this means a quite considerable increase of about 15%.

The soft resins and the portions ascertainable by the conductometer value are found in the extract in an amount of 98% each. Decisive is the yield increase of the total resins to 95% which is largely due to the increased extraction of the hard resins.

In accordance with the above procedure, but operating at substantially equal pressures, and using a bentonite absorbant to remove the saturate in place of a pressure drop, a similar result is obtained.

Similarly, but using bentonite absorbant and a pressure drop, a similar result is also obtained.

Table II shows the extract contents of specific alpha acids and the portions ascertained by the conductometer value as well as the universal bitter values (UBV) obtained according to the above described Examples. Of these three figures, the conductometer value and the UBV show the highest correlation with the bittering capacity of the hop or hop products, respectively. The product of the yield (weight %) and the UBV (mg/g) represents the potential beer bitterness which can be obtained out of the hop by an extraction process and it is the decisive factor for the capacity of bittering the beer.

Thus even though, as may be seen in Table II, in comparative Examples 1 (subcritical extraction) and 2 (supercritical extraction) the contents of specific alpha acids and the portions ascertained by the conductometer value are higher as compared with the Example according to the invention and to comparative Example 3, the bittering capacity does slightly increase.

The advantage of the method according to the invention becomes completely clear when comparing the values of the product of UBV and yield. Thus, without having to put up with the disadvantage of using methylene chloride there is obtained by the process accorind to the invention a slight increase of the universal bitter value and a clear increase of the potential beer bitterness as compared to the state of the art.

TABLE I

Extraction yield and percentages of important substances found in the extracts of different extraction processes in relation to the starting hop (HNB 1981, type 45).

|  | Pressure/bar | Temp./°C. | Yield/% | TR | HR | SR | CV | Specific Alpha Acids | Specific Beta Acids |
|---|---|---|---|---|---|---|---|---|---|
| Comparative Example 1 | 65 | 8 | 20.9 | 68 | 2 | 79 | 79 | 90 | 92 |
| Comparative Example 2 | 300 | 50 | 26.5 | 83 | 14 | 95 | 92 | 98 | 97 |
| Example | 300 | 120 | 30.4 | 95 | 73 | 98 | 98 | 99 | 98 |
| Comparative Example 3 | methylene chloride Soxhlet extraction | | 31.1 | 96 | 88 | 97 | 100 | 99 | 97 |

TABLE II

Extraction yield, specific and conductometrically determined contents (%) of alpha acids and universal bitter values of extracts obtained by different processes

|  | Yield weight % | Specific alpha acids weight % | CV weight % | UBV mg/g | UBV × Yield |
|---|---|---|---|---|---|
| Comparative Example 1 | 20.9 | 53.8 | 51.8 | 332 | 6939 |
| Comparative Example 2 | 26.5 | 46.2 | 47.6 | 343 | 9090 |
| Example | 30.4 | 40.7 | 44.2 | 361 | 11010 |
| Comparative Example 3 | 31.1 | 39.8 | 44.1 | 364 | 11320 |

We claim:

1. A process for obtaining extracts from hops by extraction of hop containing material selected from the group consisting of hops, hop powder and hop pellets by treatment thereof with supercritical carbon dioxide solvent in the absence of organic solvents under pressures of between about 100 and about 300 bar comprising the sequential steps of carrying out the extraction step at a temperature of between about 110° and about 150° C. but below the boiling point of said solvent at the aforesaid pressures, and removing said extracts from said solvent.

2. A process of claim 1 wherein the hop extract is removed from the carbon dioxide solvent by adsorbing said extract on an adsorbing agent.

3. A process according to claim 1 wherein the hop extract is removed from the carbon dioxide solvent by partially reducing the pressure of the solvent containing said extract to precipitate said extract and separating said solvent from the thus precipitated extracts by settling the extract.

4. A process of claim 1 comprising the sequential steps of:
  (a) passing said solvent continuously thru a vessel containing said hop containing material to extract said hop extracts therefrom,
  (b) passing said solvent containing said extracts into a separation vessel thru a pressure reduction means to reduce the pressure of said solvent from about 100 to 300 bar to about 40 to 80 bar to precipitate the hop extracts, separating the thus precipitated hop extracts from said solvent by settling the extract, passing said separated solvent thru a pressure raising means and recycling said solvent to step (a) hereof.

5. A process of claim 3 wherein said separation means comprises a settling tank.

6. A process of claim 3 wherein said separation means comprises an adsorption tank and an adsorbing means.

* * * * *